Nov. 28, 1961   J. W. FISHER   3,010,975
20-COBALTO-DELTA-1-HYDROCORTISONE (INNER COMPLEX SALT)
Filed April 23, 1960   3 Sheets-Sheet 1

GRANULOMA POUCH INHIBITION

| | DOSE Mg/Kg/DAY | NO. ANIMALS | BODY WT. CHANGE, Gm. | MEAN EXUDATE, Ml. | PERCENT INHIBITION[1] | P VALUE[1] |
|---|---|---|---|---|---|---|
| CONTROLS | — | 28 | +14 | 6.0 ± 2.08 | | |
| HYDROCORTISONE | 0.5 | 6 | +13 | 4.0 ± 1.97 | 33 | <.01 |
| | 1.0 | 6 | +16 | 3.6 ± 1.42 | 38 | <.01 |
| | 2.0 | 6 | + 9 | 3.1 ± 1.96 | 48 | <.01 |
| Δ-1-HYDROCORTISONE | 0.10 | 6 | +10 | 3.7 ± 1.18 | 38 | <.01 |
| | 0.25 | 6 | +14 | 3.5 ± 0.45 | 42 | <.01 |
| | 0.50 | 6 | +14 | 3.0 ± 0.78 | 50 | <.01 |
| | 1.00 | 6 | +10 | 2.1 ± 1.22 | 64 | <.01 |
| COBALT[2] | 2.0 | 6 | +12 | 3.1 ± .70 | 48 | <.01 |
| | 6.0 | 6 | + 7 | 2.8 ± .76 | 53 | <.01 |
| | 10.0 | 6 | + 3 | 2.1 ± 1.19 | 65 | <.01 |
| 20-COBALTO-Δ-1-HYDROCORTISONE | .10 | 5 | +18 | 3.60 ± 2.18 | 40 | <.01 |
| | .20 | 6 | +16 | 2.28 ± 1.17 | 62 | <.01 |
| | .50 | 5 | + 9 | 1.04 ± .62 | 83 | <.01 |
| | 1.00 | 5 | + 6 | 0.64 ± .65 | 91 | <.01 |
| COBALT + Δ-1-HYDROCORTISONE[3] | .25 (.084+.166) | 6 | + 7 | 5.00 ± 1.30 | 17 | <.10 |
| | .50 (.167+.330) | 6 | + 3 | 3.4 ± 1.24 | 43 | <.01 |
| | 1.00 (.33+.67) | 5 | + 3 | 4.0 ± 1.70 | 34 | <.01 |

[1] DETERMINED BY COMPARISON WITH CONTROLS

[2] DOSE EXPRESSED AS mg. ELEMENTAL COBALT PER Kg/DAY

[3] COBALT PLUS Δ-1-HYDROCORTISONE SIMULTANEOUSLY INJECTED AT DIFFERENT SITES-S.C.
MEAN INITIAL BODY WEIGHT OF ALL RATS (124 ANIMALS) = 148 ± 35

TABLE 1.

INVENTOR
JAMES W. FISHER
BY
Cameron, Kerkam + Sutton
ATTORNEYS

Nov. 28, 1961  J. W. FISHER  3,010,975
20-COBALTO-DELTA-1-HYDROCORTISONE (INNER COMPLEX SALT)
Filed April 23, 1960                                           3 Sheets-Sheet 2
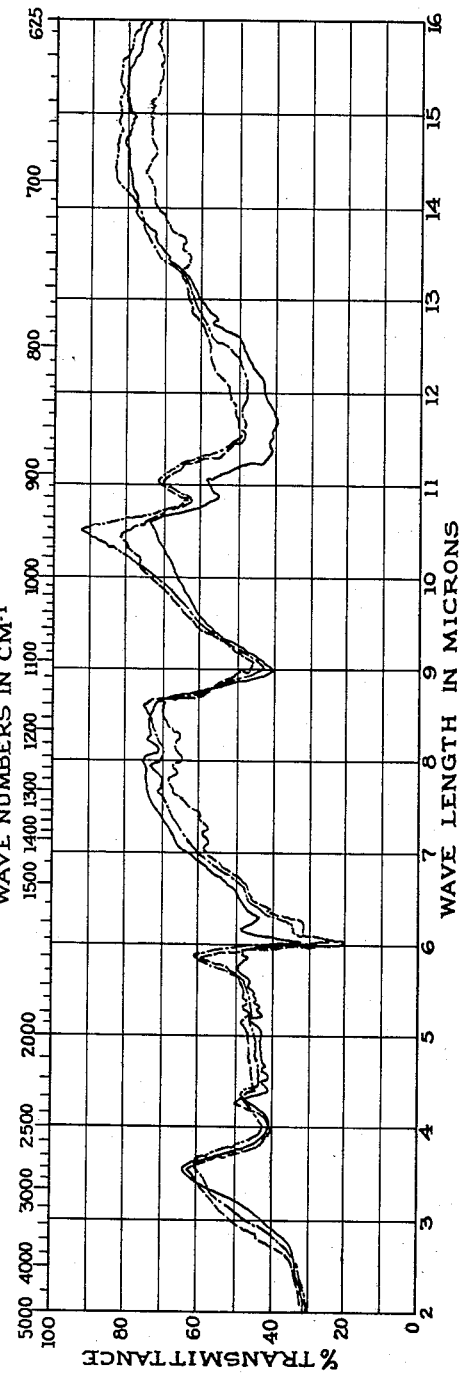
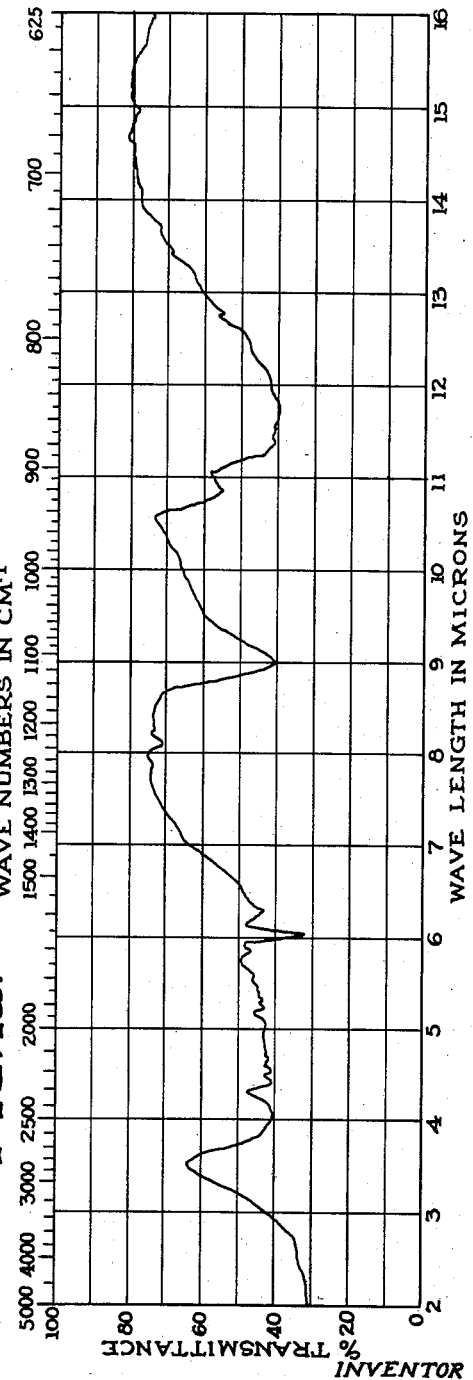
INVENTOR
JAMES W. FISHER
BY
Cameron, Kerkam & Sutton
ATTORNEYS Nov. 28, 1961
J. W. FISHER
3,010,975
20-COBALTO-DELTA-1-HYDROCORTISONE (INNER COMPLEX SALT)
Filed April 23, 1960
3 Sheets-Sheet 3
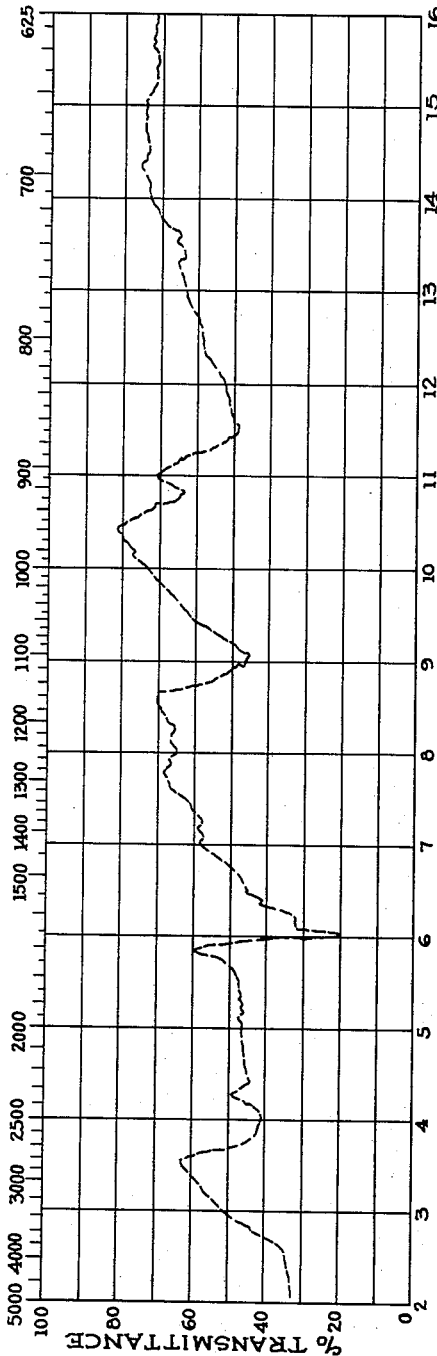
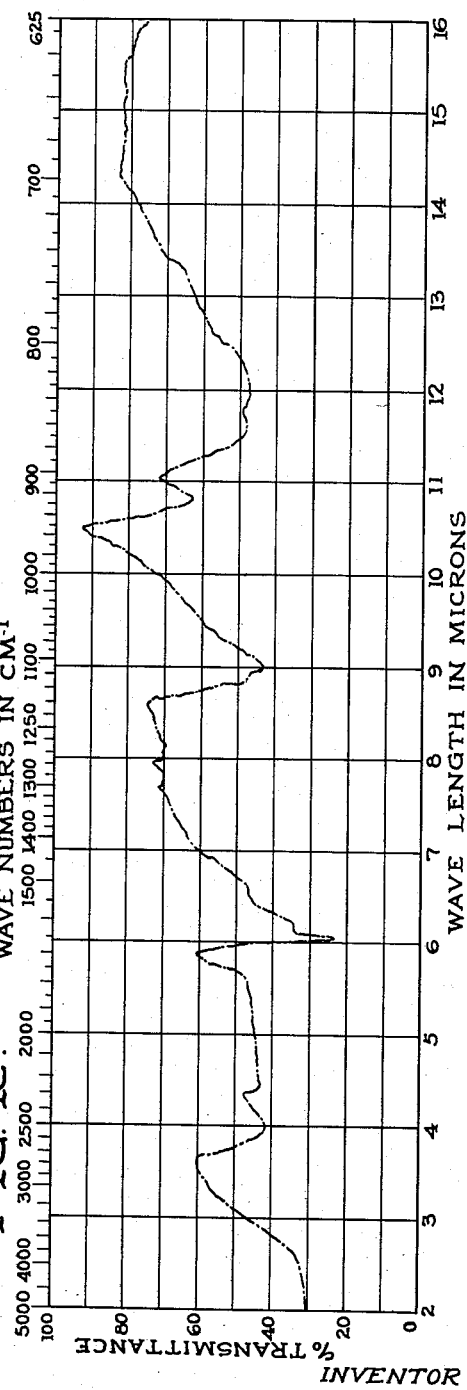
INVENTOR
JAMES W. FISHER
BY
*Cameron, Kerkam + Sutton*
ATTORNEYS

United States Patent Office 3,010,975
Patented Nov. 28, 1961

3,010,975
20-COBALTO-DELTA-1-HYDROCORTISONE
(INNER COMPLEX SALT)
James W. Fisher, Memphis, Tenn., assignor to The University of Tennessee Research Corporation, Knoxville, Tenn., a corporation of Tennessee
Filed Mar. 23, 1960, Ser. No. 17,048
1 Claim. (Cl. 260—397.45)

This invention relates to an anti-inflammatory steroid complex and more particularly to 20-cobalto-delta-1-hydrocortisone.

Heretofore, various steroids including cortisone, prednisone, hydrocortisone, prednisolone and the like have been known as anti-inflammatory compounds useful for the treatment of inflammation in humans and animals. The anti-inflammatory steroid complex of the present invention, 20-cobalto-delta-1-hydrocortisone, I have found to be more potent than either hydrocortisone or prednisolone in reducing granuloma pouch inflammation in rats.

It is therefore an object of the present invention to provide a new anti-inflammatory steroid complex, 20-cobalto-delta-1-hydrocortisone.

Another object of the present invention is to provide novel process for treating inflammation by the use of 20-cobalto-delta-1-hydrocortisone.

In the accompanying drawings,

FIG. 1 is a reproduction of infra-red spectrophotometer tracings showing in solid line delta-1-hydrocortisone in benzyl alcohol; showing in broken line delta-1-hydrocortisone plus cobaltous chloride hexahydrate in benzyl alcohol in 1 to 1 molar ratio; and showing in dot-dash line delta-1-hydrocortisone plus cobaltous chloride hexahydrate in benzyl alcohol in 2 to 1 molar ratio (20-cobalto-delta-1-hydrocortisone);

FIG. 1a is a reproduction of the infra-red curve of FIG. 1 for delta-1-hydrocortisone in benzyl alcohol;

FIG. 1b is a reproduction of the infra-red curve of FIG. 1 for delta-1-hydrocortisone plus cobaltous chloride hexahydrate in benzyl alcohol in 1 to 1 molar ratio;

FIG. 1c is a reproduction of the infra-red curve of FIG. 1 for delta-1-hydrocortisone plus cobaltous chloride hexahydrate in benzyl alcohol in 2 to 1 molar ratio (20-cobalto-delta-1-hydrocortisone); and Table 1 shows the anti-inflammatory effects of various compounds including the complex of the present invention (20-cobalto-delta-1-hydrocortisone) as obtained by the granuloma pouch technique.

The anti-inflammatory steroid complex of the present invention, 20-cobalto-delta-1-hydrocortisone, may be prepared from cobaltous chloride hexahydrate, Δ-1-hydrocortisone, and benzyl alcohol. The first step in preparation is preparing a 1% solution complex by dissolving 100 mg. delta-1-hydrocortisone (prednisolone) in 13.3 ml. benzyl alcohol. After the crystals have dissolved in from 15 to 20 minutes, 33.0 mg. $CoCl_2 \cdot 6H_2O$ is added. This solution complex is then permitted to stand for 24 hours with mixing at approximately 1 hour intervals. Mixing is preferably done by inverting the container several times to insure complete mixing of the contents. After mixing, the injection solution is ready for use and aliquots may be removed sufficient to give the desired concentration of complex in a 0.9% NaCl solution. It should be noted that benzyl alcohol concentration in the injection solution should preferably be less than 5%.

Calculations from this procedure are:

0.0137 molar elemental cobalt = 33 mg.

$CoCl_2 \cdot 6H_2O / 13.3$ ml. benzyl alcohol. 0.0274 molar Δ-1-hydrocortisone = 100 mg. Δ-1-hydrocortisone/13.3 ml. benzyl alcohol.

The chemical reaction involved in this procedure may be graphically illustrated as follows:

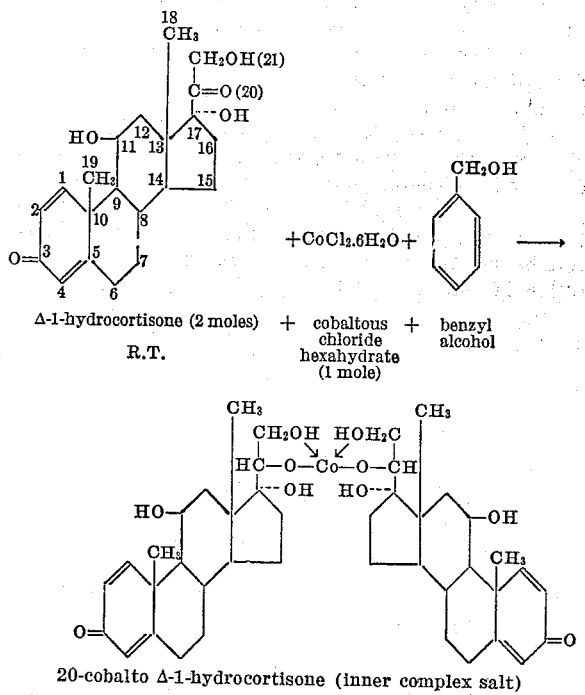

Hydrocortisone: Cobalt (elemental) molarity ratio is 2:1.

Referring now to FIGS. 1, 1a, 1b and 1c, which are reproductions of the original infra-red spectrophotometer tracings, it is there shown that the cobalt atom of cobaltous chloride hexahydrate was reacted with the carbonyl function (ketone at C20) of delta-1-hydrocortisone. The infra-red curves of FIGS. 1b and 1c show two new peaks at 5.8 microns when cobaltous chloride hexahydrate is added to delta-1-hydrocortisone and benzyl alcohol which peaks indicate a bidentate chelate structure for 20-cobalto-delta-1-hydrocortisone.

Table 1 has been identified above as a tabular representation of the anti-inflammatory effects of various compounds including the complex of the present invention, 20-cobalto-delta-1-hydrocortisone, using the granuloma pouch technique. The technique is described in detail in Lyster, S. C. Proc. Soc. Exp. Biol. Med., 94:159, 1957.

The data in Table 1, including that for the "complex" (20-cobalto-delta-1-hydrocortisone) shows that this complex is more potent in reducing inflammation than either hydrocortisone, delta-1-hydrocortisone, cobaltous chloride hexahydrate or simultaneous injections of delta-1-hydrocortisone and cobaltous chloride hexahydrate at different subcutaneous sites. When the .20, 0.50, 1.00 mg./kg./day dose of the "complex" (20-cobalto-delta-1-hydrocortisone) is compared with equivalent dosages of delta-1-hydrocortisone (parent molecule), it was found to be significantly ($P < .01$) more potent. A statistical comparison of the "complex" (20-cobalto-delta-1-hydrocortisone) with approximately equivalent dosages (Table 1) of hydrocortisone, cobaltous chloride hexahydrate or a combination of cobaltous chloride hexahydrate and delta-1-hydrocortisone revealed the "complex" to be significantly ($P < .01$) more potent in reducing inflammation.

A logarithmic plot of the dose-response function of the "complex" (slope 1.32) and delta-1-hydrocortisone (slope .77) proved the complex to be significantly more potent than delta-1-hydrocortisone (parent molecule).

Statistical analysis of co-variance of the 2 slopes (technique of variation from significant parallelism) revealed the slope of the 20-cobalto-delta-1-hydrocortisone dose-response line (1.38) to be significantly greater than that of delta-1-hydrocortisone (.77).

Clinical evaluation of this complex (20-cobalto-delta-1-hydrocortisone) may prove that it is superior to the anti-inflammatory potency of many of the steroids presently being used for the treatment of inflammatory diseases.

It should now be apparent that 20-cobalto-delta-1-hydrocortisone in every way satisfies the several objectives described above.

It should be apparent to those skilled in the art that changes to the above described illustrative procedure for obtaining the anti-inflammatory steroid complex of the present invention may be made without departing from the present inventive concept. Reference should therefore be had to the appended claim to determine the scope of this invention.

What is claimed is:
20-cobalto-delta-1-hydrocortisone having the formula

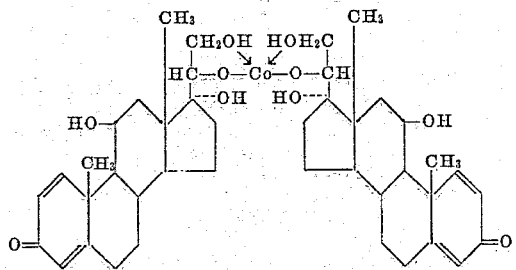

References Cited in the file of this patent
UNITED STATES PATENTS 2,829,085    Gerber _____ Apr. 1, 1958
2,856,329    Taylor _____ Oct. 14, 1958